United States Patent [19]
Derr et al.

[11] Patent Number: 5,163,538
[45] Date of Patent: Nov. 17, 1992

[54] LOW LEVEL DAMPING VALVE AND METHOD FOR A SEMI-ACTIVE HYDRAULIC DAMPER

[75] Inventors: Randall L. Derr, Bellbrook; Stephen E. Dourson; Chris F. Keller, Jr., both of Dayton; William S. Morgan, Centerville, all of Ohio

[73] Assignee: General Motors Company, Detroit, Mich.

[21] Appl. No.: 753,481

[22] Filed: Sep. 3, 1991

[51] Int. Cl.⁵ ............................................. F16F 9/34
[52] U.S. Cl. .................................. 188/318; 188/299
[58] Field of Search ............... 188/299, 314, 315, 318

[56] References Cited

U.S. PATENT DOCUMENTS

| | | | |
|---|---|---|---|
| 2,078,364 | 4/1937 | Becker et al. | 188/315 |
| 2,090,621 | 8/1937 | Chisholm, Jr. | 188/315 X |
| 3,090,611 | 5/1963 | Schultze | 188/315 X |
| 4,650,042 | 3/1987 | Knecht et al. | 188/299 |
| 4,749,069 | 6/1988 | Knecht et al. | 188/299 |
| 4,802,561 | 2/1989 | Knecht et al. | |
| 4,832,162 | 5/1989 | Bacardit | |
| 4,880,086 | 11/1989 | Knecht et al. | |
| 4,960,188 | 10/1990 | Wossner | |
| 4,988,967 | 1/1991 | Miller et al. | |
| 5,024,460 | 6/1991 | Hanson et al. | |

FOREIGN PATENT DOCUMENTS 1242945 6/1967 Fed. Rep. of Germany .
58-30814 2/1983 Japan .

Primary Examiner—George E. A. Halvosa
Attorney, Agent, or Firm—A. Michael Tucker

[57] ABSTRACT

A semi-active hydraulic damper includes a solenoid valve assembly for controlling fluid flow through a bypass channel. A blow-off valve assembly is provided in series with the solenoid valve assembly to provide low-level damping when the bypass channel is open.

19 Claims, 3 Drawing Sheets

LOW LEVEL DAMPING VALVE AND METHOD FOR A SEMI-ACTIVE HYDRAULIC DAMPER

BACKGROUND OF THE INVENTION

1. Field of the Invention

The present invention relates generally to controllable hydraulic dampers for vehicular suspension. In particular, the present invention is concerned with a low level damping valve mounted in series with a solenoid valve in a semi-active suspension actuator.

2. Description of the Related Art

For purposes of this specification, an active suspension system includes an actuator capable of modifying the force between a vehicular body and a wheel assembly in response to a control in real time to produce a desired suspension behavior. A semi-active suspension system is similar but uses an actuator (a damper) which provides only damping or dissipative forces in real time wherein the suspension system generates its own force. Additionally, an on/off semi-active damper has only two operating modes with fixed force/velocity damping curves: a first mode having a low damping force ("soft") when the solenoid valve is open; and a second mode having a high damping force ("firm") when the solenoid valve is closed. A continuously variable semi-active damper has a continuous range of damping modes between minimum and maximum settings.

Semi-active dampers include electric solenoid valves capable of switching a damper between operating modes at frequencies preferably at least twice the resonant wheel vibration frequency to achieve real time control of wheel and body motions. Semi-active dampers are also known as "fast shocks" and as "real time dampers."

Passive hydraulic dampers (shock absorbers and struts) include a reciprocable piston and piston rod slidably mounted in a fluid-filled cylinder. The piston divides the interior of the cylinder into upper and lower chambers. A valve assembly in the piston provides a restricted fluid path between the chambers. A reservoir tube concentrically mounts and cooperates with the cylinder to form a fluid reservoir. The lower end of the cylinder is closed by a compression or base valve assembly. During a compression stroke, fluid travels from the lower chamber through the piston valve assembly to the upper chamber. An amount of fluid equal to the increasing rod volume in the upper chamber travels through the base valve assembly to the reservoir. During a rebound stroke, fluid travels from the upper chamber through the piston valve assembly to the lower chamber. Also, fluid travels from the reservoir through the base valve assembly to the lower chamber to compensate for the rod volume. The restriction of fluid through the piston and base valve assemblies provides the level of damping in a damper.

A semi-active damper uses a bypass channel between the upper chamber and the reservoir in a well-known manner. As described above, a semi-active damper incorporates either an on/off or continuously variable solenoid valve assembly to control fluid flow in the bypass channel. When the solenoid valve assembly is opened, fluid travels from the upper chamber to the reservoir through the bypass channel. This redirection of fluid changes the damping characteristic of the damper to a "soft" setting, since the bypass channel permits fluid flow with less restriction than the piston and base valve assemblies. When the solenoid valve assembly is closed, fluid is forced to flow through the piston and base valve assemblies in the usual manner, resulting in a "firm" setting.

Semi-active dampers can be tuned so that the vehicle experiences a boulevard-type ride with operating in the soft mode. It has been determined that a certain amount of low damping is desirable at such conditions to improve vehicle handling.

The art continues to seek improvements. It is desirable to provide low level damping in a semi-active damper to enhance ride control.

SUMMARY OF THE INVENTION

The present invention includes a low level damping valve mounted in series with a solenoid valve in a semi-active damper. The low level damping valve includes a blow-off valve assembly which receives fluid from a bypass channel. When the solenoid valve is opened, fluid flows first through the low level damping valve and then through the solenoid valve to reach a reservoir. This fluid path provides low level damping to enhance ride control.

DETAILED DESCRIPTION OF THE PREFERRED EMBODIMENT

Figure 1:
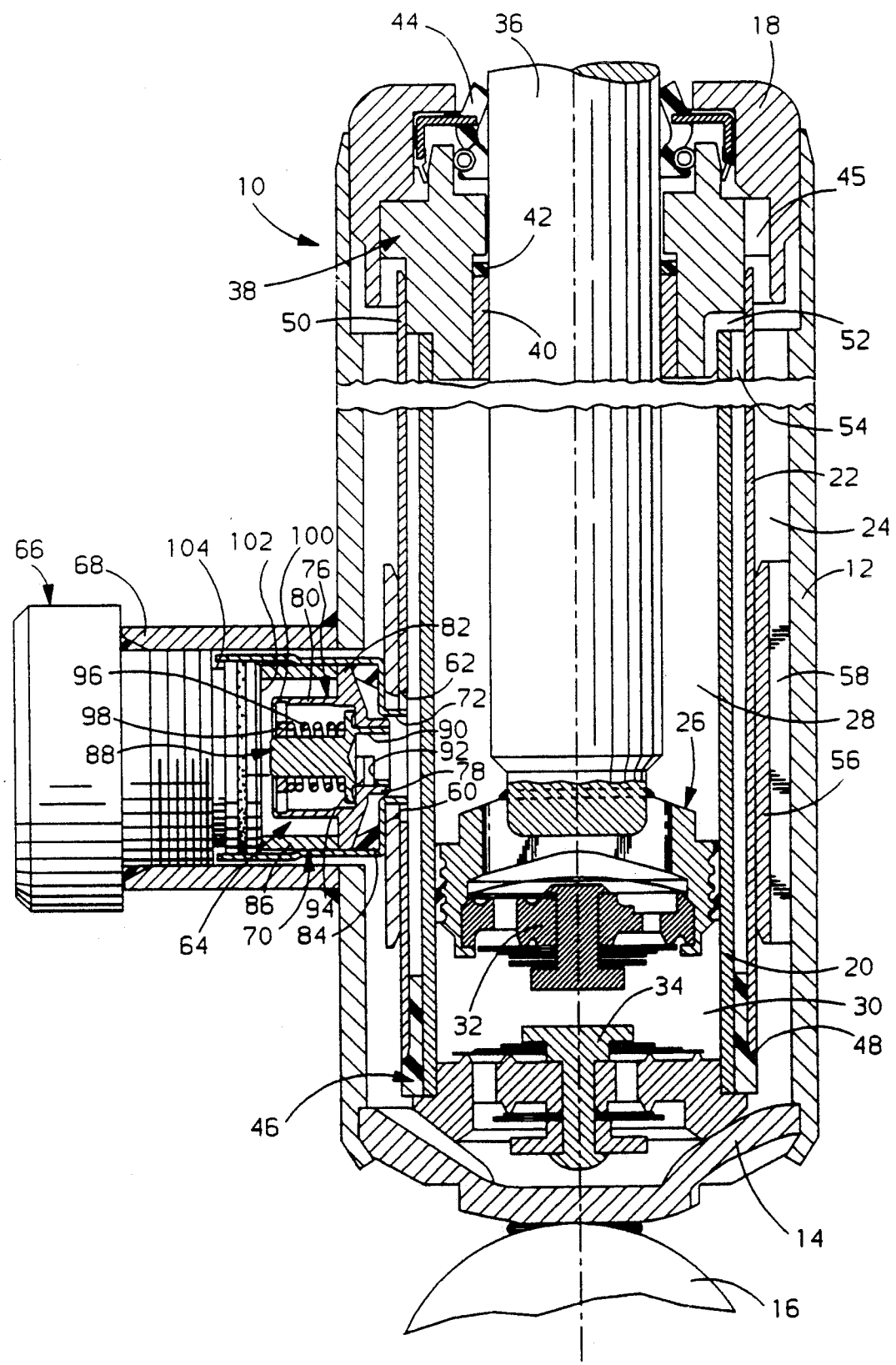
FIG. 1 is a longitudinal sectional view of a semi-active hydraulic damper including a low level damping valve according to the present invention mounted in series with a solenoid valve assembly.

A semi-active hydraulic damper is indicated generally at 10 in FIG. 1. The damper 10 includes an outer reservoir tube 12 closed at its lower end by an end cap 14. A mounting fitting 16 is provided on the end cap 14 for securing the damper 10 to a vehicular road wheel assembly (not illustrated) in a well-known manner. A seal cover 18 is welded or otherwise secured to the upper end of the reservoir tube 12.

A fluid-filled inner cylinder 20 is spaced inwardly from and concentric with the reservoir tube 12. An intermediate tube 22 is concentrically mounted about the inner cylinder 20 as described below. The volume between the intermediate tube 22 and the reservoir tube 12 forms a fluid reservoir 24. A piston 26 is slidably mounted inside the inner cylinder 20 and divides the interior volume of the inner cylinder 20 into an upper chamber 28 and a lower chamber 30. The piston 26 includes well-known internal valving 32 which provides a restricted flow path between the lower chamber 30 and the upper chamber 28 as the piston 26 reciprocates in the inner cylinder 20. A well-known compression valve assembly 34 secured to and closing the lower end of the inner cylinder 20 controls the flow of fluid between the reservoir 24 and the lower chamber 30 during operation of the damper 10 as described below.

A piston rod 36 is attached at its inner end to the piston 26 and is connected at its upper end (not illustrated) to bodywork (not illustrated) of a vehicle in any conventional manner. The piston rod 36 passes through a rod guide 38 press fitted onto the upper end of the inner cylinder 20 and held in position by the seal cover 18. An annular bearing 40 is fitted into a central passage of the rod guide 38 and receives the piston rod 36. A high-pressure seal ring 42 is provided about the rod guide 38 adjacent the bearing 40. A low-pressure seal assembly 44 is seated on the rod guide 38 and has sealing contact with the piston rod 36 to prevent loss of hydraulic fluid from the damper 10 as the piston 26 strokes in the inner cylinder 20 during operation. A return passage 45 is provided in the outer circumference of the rod guide 38 for fluid which leaks past the high-pressure seal ring 42 to return to the reservoir 24.

A tube seal adapter 46 preferably formed from a suitable polymeric material is press fitted onto a lower end of the inner cylinder 20. A circumferential shoulder 48 of the adapter 46 receives a lower end of the intermediate tube 22. An upper end of the intermediate tube 22 is press fitted onto an intermediate diameter portion 50 of the rod guide 38.

A plurality of ports 52 (only one of which is illustrated in FIG. 1) is formed in the rod guide 38 to provide fluid communication between the upper chamber 28 and an annular bypass channel 54 formed by the volume between the inner cylinder 20 and the intermediate tube 22. The tube seal adapter 46 blocks the lower end of the bypass channel 54 and forms a fluid seal.

A sleeve 56 which can include longitudinal ribs 58 is press fitted onto the intermediate tube 22 and includes an opening 60 aligned with an opening 62 provided in the intermediate tube 22. Openings 60 and 62 provide fluid communication between the bypass channel 54 and a low level damping valve assembly 64 mounted in series with a solenoid valve assembly 66. A valve boss 68 is welded to the reservoir tube 12 and includes internal threads for receiving the solenoid valve assembly 66.

The low level damping valve assembly 64 is housed in a hollow, cylindrical seal cup 70 having a protruding inlet portion 72 which is urged into openings 60 and 62 as the solenoid valve assembly 66 is threaded inwardly into the valve boss 68. A valve cage indicated generally at 76 is a generally cylindrical member having a stem 78 at a first end and an annular skirt 80 at a second end. A retainer flange 82 is provided between the stem 78 and the skirt 80. An annular elastomeric isolator 84 is provided between an inner end surface of the seal cup 70 and the retainer flange 82. A ring-like spacer 86 is provided between the retainer flange 82 and the innermost end of the solenoid valve assembly 66. As the solenoid valve assembly 66 is threaded inwardly to engage the spacer 86 against the retainer flange 82, the elastomeric isolator 84 is compressed and provides a fluid seal between the valve cage 76 and the seal cup 70.

A relief valve indicated generally at 88 is a substantially cylindrical member including an opening 90 and gate 92 in an inner portion slidably received in the stem 78 and a circumferential stop flange 94 formed about its central portion. The relief valve 88 is inserted inside the annular skirt 80 so that the stop flange 94 rests on an inner surface of the stem 78.

A helical or coil spring 96 is provided about the outer portion of the relief valve 88. A first end of the spring 96 is seated against the stop flange 94. A second end of the spring 96 is seated against a slotted retainer 98 held in place by a crimped end 100 of the skirt 80.

Figure 3:
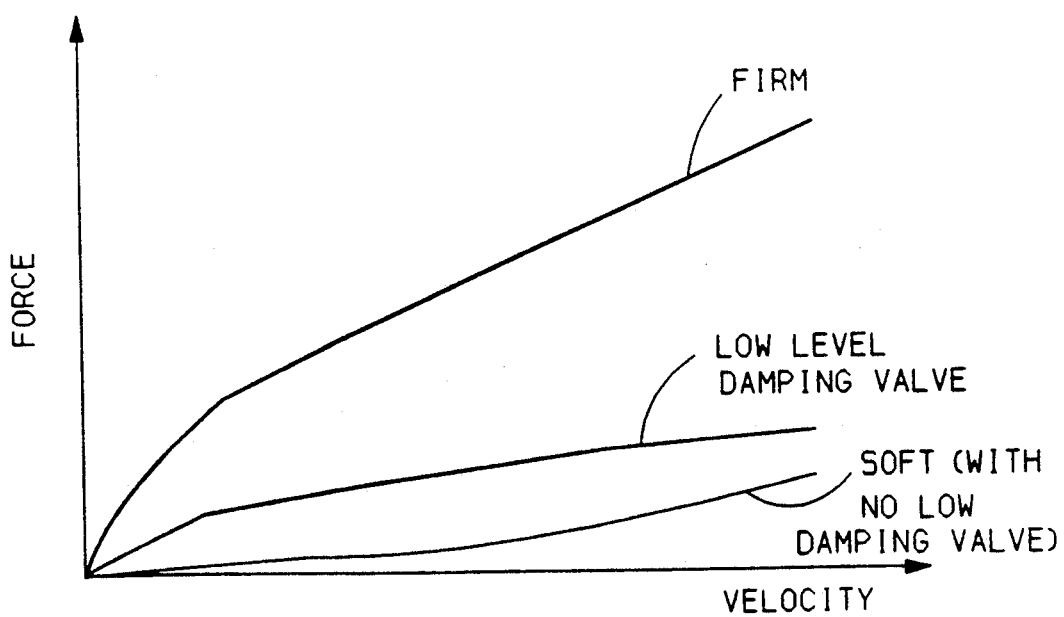
FIG. 3 is a graph illustrating typical force-velocity damping curves for the semi-active damper of FIG. 1.
Figure 4:
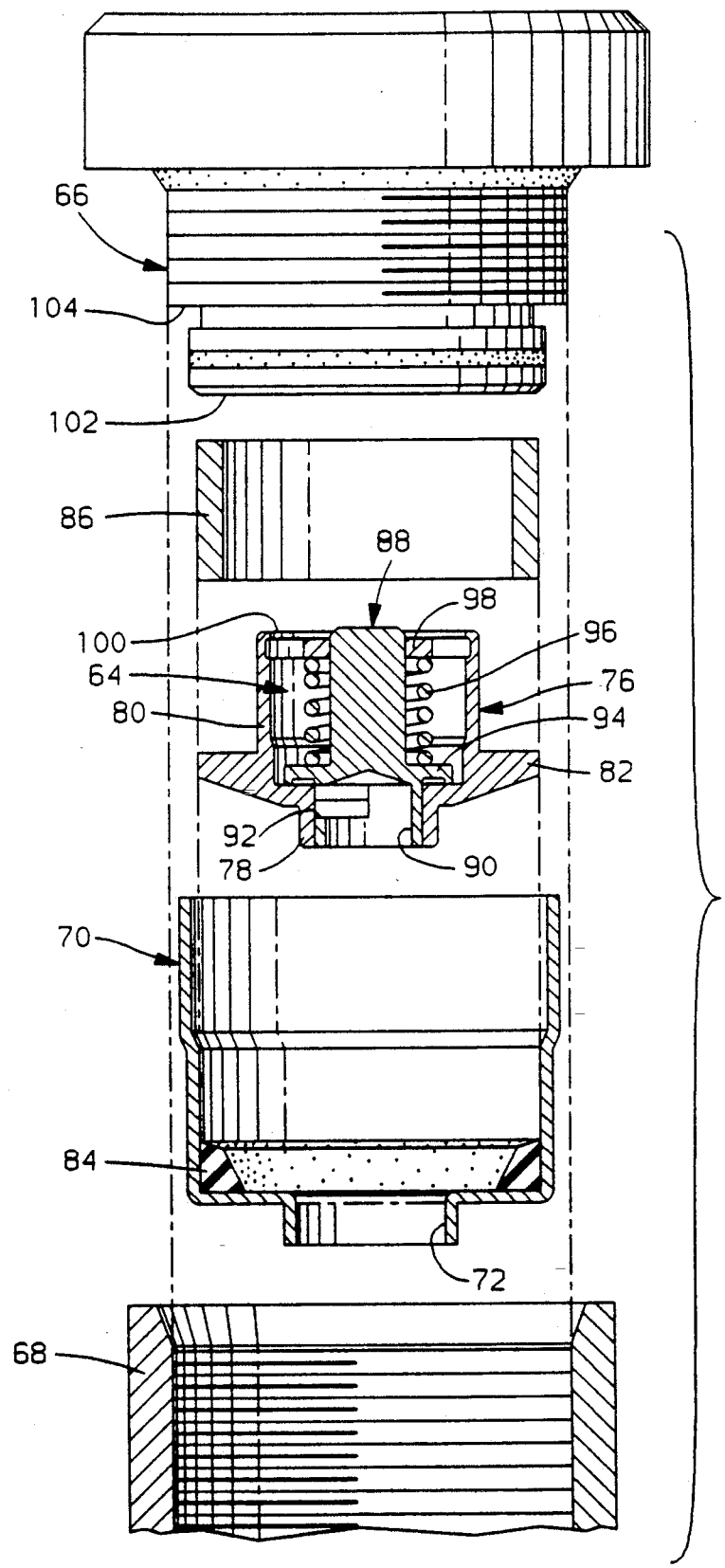
FIG. 4 is an enlarged sectional view of the low level damping valve of FIG. 1 shown exploded from the solenoid valve assembly, a spacer and a seal cup, all of which are received by a valve boss provided on the hydraulic damper.

The solenoid valve assembly 66 includes an inlet portion 102 in fluid communication with the low level damping valve assembly 64 and an annular outlet portion 104 in communication with the reservoir 24. When the solenoid valve assembly 66 is energized by a controller (not illustrated), an internal passage (not illustrated) is opened which permits the one-way passage of fluid from the inlet portion 102 to the outlet portion 104. When the solenoid valve assembly 66 is not energized, fluid flow is blocked through its internal passage. Without the low level damping valve assembly 64, opening the solenoid valve assembly 66 changes the damping force provided by the damper 10 from a "firm" mode to a "soft" mode by routing fluid through the bypass channel 54 to the reservoir 24 instead of through the compression valve assembly 34. The force-velocity curves illustrated in FIG. 3 illustrate such firm and soft damping characteristics.

The inclusion of the present low level damping valve assembly 64 in series with the solenoid valve assembly 66 changes the damping characteristics of the damper 10. When the solenoid valve assembly 66 is energized and opened, fluid from the bypass channel 54 first flows through the low level damping valve assembly 64 and then through the solenoid valve assembly 66 to reach the reservoir 24. The spring-biased relief valve 88 acts as a blow-off element and provides a restriction as fluid flows to the solenoid valve assembly 66. As a result, the damper 10 provides a low level of damping as depicted in FIG. 3. It is understood that the low level damping valve assembly 64 can be tuned to provide a desired low level damping rate.

Figure 2:
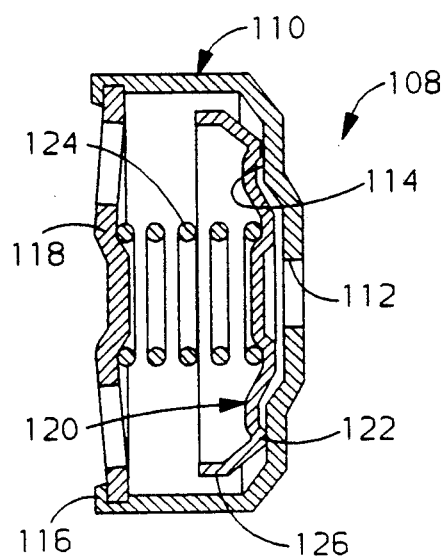
FIG. 2 is a sectional view of a second embodiment of a low level damping valve according to the present invention removed from the damper of FIG. 1 for purposes of clarity of illustration.

A second embodiment of the present low level damping valve assembly is indicated generally at 108 in FIG. 2. The assembly 108 has been removed from the damper 10 of FIG. 1 for clarity and would be substituted for the first low level damping valve assembly 64.

The valve assembly 108 includes a cup-like valve cage 110 having a central orifice 112 in a forward wall 114. The forward wall 114 engages the elastomeric isolator 84 as the solenoid valve assembly 66 is threaded inwardly in the valve boss 68 and into contact with a crimped end 116 of the valve cage 110 which secures a slotted retainer 118. The spacer 86 illustrated in FIG. 1 is not required when valve assembly 108 is mounted in series with the solenoid valve assembly 66.

A valve plate 120 includes an annular, coined sealing surface 122 urged against the forward wall 114 by a first end of a spring 124. The second end of the spring 124 is seated on the retainer 118. A circumferential flange 126 is provided on the valve plate 120.

When the solenoid valve assembly 66 is opened, fluid from the bypass channel 54 flows through the orifice 112 and forces the sealing surface 122 away from the forward wall 114. Fluid is directed past the flange 126, which acts as a self-centering element for the valve plate 120, and the retainer 118 to reach the solenoid valve assembly 66 and the reservoir 24. It is appreciated that the valve assembly 108 can be tuned to provide a desired low level damping rate.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A hydraulic damper for vehicular suspension comprising:
   (a) a fluid-filled inner cylinder;
   (b) a piston slidably mounted in the inner cylinder and dividing the inner cylinder into upper and lower chambers;
   (c) piston valving means for controlling fluid flow through the piston;
   (d) a reservoir tube concentrically mounting the inner cylinder and cooperating therewith to form a fluid reservoir;
   (e) compression valve means for controlling fluid flow between the lower chamber and the reservoir;
   (f) a bypass channel formed between the inner cylinder and the reservoir for receiving fluid from the upper chamber;
   (g) a seal cup having an inlet in fluid communication with the bypass channel, the seal cup being slidably received in a valve boss mounted on an exterior surface of the reservoir tube;
   (h) blow-off valve means inserted into the seal cup, the blow-off valve means having an axially-displaceable valve element normally biased closed by spring means to provide low level damping when the blow-off valve means is opened by fluid pressure; and
   (i) solenoid valve means, housed separately from the blow-off valve means, secured to the valve boss downstream of the blow-off means, the solenoid valve means having an inlet portion for receiving fluid from the opened blow-off valve means and an outlet portion directing fluid to the reservoir when the solenoid valve means is energized.

2. The hydraulic damper specified in claim 1 wherein the blow-off valve means includes a valve cage housing the spring-biased valve element.

3. The hydraulic damper specified in claim 2 wherein the valve element is a valve stem having an opening and a gate in fluid communication with the bypass channel.

4. The hydraulic damper specified in claim 2 wherein the valve element is a plate having a circumferential flange.

5. The hydraulic damper specified in claim 1 wherein the inlet portion of the solenoid valve means is received within the seal cup.

6. The hydraulic damper specified in claim 1 wherein the bypass channel is formed between the inner cylinder and an intermediate tube concentrically mounted about the inner cylinder.

7. The hydraulic damper specified in claim 6 wherein a tube seal adapter formed from a polymeric material is press fit to lower ends of the inner cylinder and the intermediate tube to seal the bypass channel from the reservoir.

8. The hydraulic damper specified in claim 1 including an elastomeric isolator provided between the seal cup and the blow-off valve means.

9. A method of providing low level damping in a semi-active suspension damper having solenoid valve means for controlling fluid flow through a bypass channel, the method comprising the steps of:
   (a) mounting a valve boss to an exterior surface of the damper;
   (b) inserting a seal cup into the valve boss so that an inlet portion is in fluid communication with the bypass channel;
   (c) inserting a valve cage into the seal cup, the valve cage housing an axially-displaceable valving element and a coil spring, wherein the valving element is selectively closed by the coil spring;
   (d) inserting the solenoid valve means formed separately from the valve cage into the valve boss, wherein the solenoid valve means receives fluid from the valve cage and returns such fluid to a reservoir when the solenoid valve means is energized; and
   (e) securing the solenoid valve means to the valve boss.

10. The method specified in claim 9 wherein the solenoid valve means is threaded to the valve boss.

11. An adjustable hydraulic damper for vehicular suspension comprising:
    (a) a fluid-filled cylinder;
    (b) a piston slidably disposed in the cylinder, dividing the cylinder into upper and lower chambers;
    (c) piston valving means for controlling fluid flow between the upper and lower chambers;
    (d) an intermediate tube concentrically mounted about the cylinder;
    (e) a bypass channel formed between the intermediate tube and the cylinder;
    (f) port means directing fluid flow from the upper chamber to the bypass channel;
    (g) a reservoir tube concentrically mounted about the intermediate tube and cooperating therewith to form a fluid reservoir;
    (h) compression valve means for controlling fluid flow between the lower chamber and the reservoir;
    (i) a valve boss mounted on an exterior surface of the reservoir tube;
    (j) a hollow seal cup inserted into the valve boss so that an inlet portion is in fluid communication with the bypass channel;
    (k) a low level damping valve assembly inserted into the seal cup to provide a desired damping rate when the damping valve assembly is opened by fluid pressure, the low level damping valve assembly including a valve cage housing an axially-displaceable valve element; and
    (l) an electromechanical valve assembly having a housing formed separately from the low level damping valve assembly, the housing including an inlet inserted into the seal cup downstream of the low level damping valve, whereby fluid flow through the low level damping valve is prevented when the electromechanical valve assembly is closed, and wherein fluid flowing through the opened electromechanical valve assembly is directed to the reservoir.

12. The hydraulic damper specified in claim 11 wherein the valve element of the low level damping valve assembly is biased closed by a coil spring retained in the valve cage.

13. The hydraulic damper specified in claim 12 wherein the valve element is a valve stem having an opening and a gate in fluid communication with the bypass channel.

14. The hydraulic damper specified in claim 12 wherein the valve element is a plate having a circumferential flange.

15. The hydraulic damper specified in claim 11 wherein the electromechanical valve assembly includes a solenoid valve assembly.

16. The hydraulic damper specified in claim 11 wherein the valve boss includes internal threads mated with external threads of the electromechanical valve assembly.

17. The hydraulic damper specified in claim 11 wherein the electromechanical valve assembly is normally closed.

18. The hydraulic damper specified in claim 11 including an elastomeric isolator provided between the seal cup and the valve cage.

19. The hydraulic damper specified in claim 11 including a tube seal adaptor formed from a polymeric material press fit to lower ends of the cylinder and the intermediate tube to seal the bypass channel from the reservoir.

* * * * *